R. C. BAKER.
PUMP PLUNGER.
APPLICATION FILED JUNE 4, 1913.

1,101,234.

Patented June 23, 1914.

Reuben C. Baker
Inventor, by C. A. Snow & Co.
Attorneys.

Witnesses

UNITED STATES PATENT OFFICE.

REUBEN C. BAKER, OF COALINGA, CALIFORNIA.

PUMP-PLUNGER.

1,101,234. Specification of Letters Patent. Patented June 23, 1914.

Application filed June 4, 1913. Serial No. 771,722.

*To all whom it may concern:*

Be it known that I, REUBEN C. BAKER, a citizen of the United States, residing at Coalinga, in the county of Fresno and State of California, have invented a new and useful Pump-Plunger, of which the following is a specification.

My invention relates to new and useful improvements in a pump plunger and more particularly to a device of this character adapted and intended for use in oil wells.

The object of the invention is the provision of a plunger in which the packing rings may be adjusted to take up any wear which may have occurred.

A further object is the provision of means for holding the several parts in their adjusted positions.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
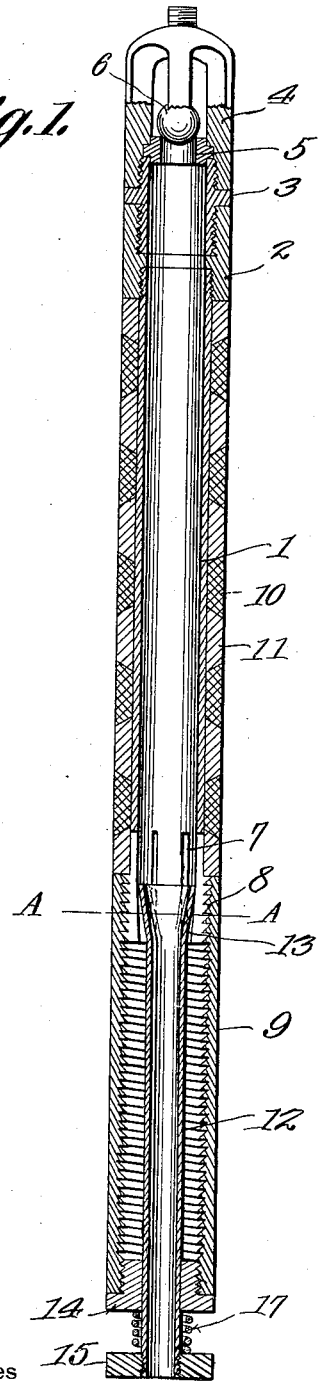
Figure 2:
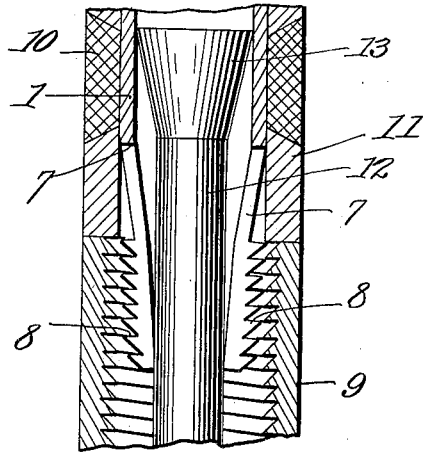
Figure 3:
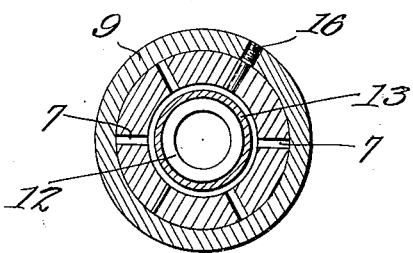

In the drawings:—Figure 1 is a vertical sectional view. Fig. 2 is a fragmental sectional view of the end of the cylinder and sleeve. Fig. 3 is a cross section on the line A—A of Fig. 1.

In the drawings the numeral 1 indicates a cylinder, the upper end of which is threaded to receive the ferrule 2 into which is screwed the coupling member 3 and on the coupling member 3 is threaded the valve casing 4 in which is the valve seat 5 upon which the ball 6 is adapted to rest. The lower end of the cylinder 1 is provided with the longitudinal slots 7 and on the exterior of the cylinder are formed the teeth 8. An interiorly threaded sleeve 9 is adjustable on the cylinder 1 and the interior threads are adapted to be engaged by the teeth 8 formed on the cylinder. Surrounding the cylinder 1 between the ferrule 2 and the sleeve 9 are the packing rings 10 and the wedge rings 11. A tube 12 having the tapered end 13 is received in the end of the cylinder 1 and extends through the sleeve 9 and the nut 14 which is screwed into the end of the sleeve. On the end of the tube is a nut 15. A pin 16 is screwed into the cylinder and extends through one of the slots to prevent the sleeve from unscrewing from the cylinder. A coiled spring 17 encircles the tube 12 between the nuts 14 and 15 and normally holds the tube in its lowered position.

Having described the detailed construction of my device I will now proceed to describe the operation. As shown in Fig. 1 of the drawings the teeth on the end of the cylinder are engaging the interior threads of the sleeve and the tapered end of the tube 12 forces and holds the teeth into engagement with the sleeve. When the packing rings have become worn and it is desired to take up the wear the plunger is lowered in the well casing until the nut 15 on the end of the tube 12 is engaged by the casing and the tapered end 13 is then forced up out of engagement with the end of the cylinder. The sleeve can then be forced up onto the cylinder, the end of the cylinder and teeth assuming the position shown in Fig. 2 of the drawings and the wedge members 11 will force the packing rings outward into engagement with the well casing. When the rings have been properly expanded the plunger is raised and this will allow the tube to drop into the position shown in Fig. 1, thereby locking the sleeve on the cylinder. When the packing rings have become so badly worn so that it is necessary to renew the same the sleeve can be removed from the cylinder by screwing the same off after the pin 16 has been removed from the cylinder.

Having fully described the invention what I claim as new and desire to secure by Letters Patent is:

1. A pump plunger comprising a cylinder having teeth formed thereon, a threaded sleeve adjustable on the cylinder and engaged by the teeth, packing rings surrounding the cylinder, and a lock in the cylinder for holding the teeth in contact with the sleeve.

2. A pump plunger comprising a cylinder having a valve casing secured to the upper end and teeth formed on the lower end, a threaded sleeve adjustable on the cylinder and engaged by the teeth, packing rings surrounding the cylinder between the valve casing and sleeve, and a locking member in the cylinder for holding the teeth in contact with the sleeve.

3. A pump plunger comprising a cylinder having a valve casing secured to the upper end and teeth formed on the lower end, a threaded sleeve adjustable on the cylinder and engaged by the teeth, packing rings surrounding the cylinder between the valve casing and sleeve, and a tapered tube in the cylinder for holding the teeth in contact with the sleeve.

4. A pump plunger comprising a cylinder having a valve casing secured to the upper end and teeth formed on the lower end, a threaded sleeve adjustable on the cylinder and engaged by the teeth, packing rings surrounding the cylinder between the valve casing and sleeve, and a tapered tube engaging the end of the cylinder for holding the teeth in contact with the sleeve, said tube extending through the sleeve and having a nut on the end.

5. A pump plunger comprising a cylinder having a valve casing secured to the upper end and longitudinal slots formed in the lower end, teeth formed on the exterior of the lower end of the cylinder, a threaded sleeve adjustable on the cylinder and engaged by the teeth, packing and wedge rings surrounding the cylinder between the valve casing and sleeve, and a tapered tube in the cylinder for holding the teeth in contact with the sleeve, said tube extending through the sleeve.

In testimony that I claim the foregoing as my own, I have hereto affixed my signature in the presence of two witnesses.

REUBEN C. BAKER.

Witnesses:
JOHN K. COLLINS,
HENRY S. RICHMOND.

---

Copies of this patent may be obtained for five cents each, by addressing the "Commissioner of Patents, Washington, D. C."